US011112063B2

(12) United States Patent
Rauffmann et al.

(10) Patent No.: US 11,112,063 B2
(45) Date of Patent: Sep. 7, 2021

(54) SENSOR FOR A HIGH-PRESSURE LINE, AND METHOD FOR PRODUCING SAME

(71) Applicant: Sandvik Materials Technology Deutschland GmbH, Düsseldorf (DE)

(72) Inventors: Udo Rauffmann, Werther (DE); Christofer Hedvall, Bielefeld (DE); Thomas Froböse, Versmold (DE)

(73) Assignee: Sandvik Materials Technology Deutschland GmbH, Düsseldorf (DE)

( * ) Notice: Subject to any disclaimer, the term of this patent is extended or adjusted under 35 U.S.C. 154(b) by 334 days.

(21) Appl. No.: 16/061,480

(22) PCT Filed: Dec. 16, 2016

(86) PCT No.: PCT/EP2016/081539
§ 371 (c)(1),
(2) Date: Aug. 19, 2019

(87) PCT Pub. No.: WO2017/103181
PCT Pub. Date: Jun. 22, 2017

(65) Prior Publication Data
US 2020/0025339 A1 Jan. 23, 2020

(30) Foreign Application Priority Data

Dec. 18, 2015 (DE) ...................... 10 2015 122 296.5

(51) Int. Cl.
*F17D 5/06* (2006.01)
*B21C 1/22* (2006.01)
(Continued)

(52) U.S. Cl.
CPC .................. *F17D 5/06* (2013.01); *B21C 1/22* (2013.01); *B21C 37/154* (2013.01);
(Continued)

(58) Field of Classification Search
CPC ............. G01M 5/0025; G01M 5/0041; G01M 5/0066; B21C 1/22; B21C 37/154; F17D 5/06
See application file for complete search history.

(56) References Cited

U.S. PATENT DOCUMENTS 4,558,721 A * 12/1985 Trudell et al. .......... B21C 37/06
138/151
4,694,864 A * 9/1987 Libin .................... B21C 37/154
138/113
(Continued)

FOREIGN PATENT DOCUMENTS

CN         1772409 A      5/2006
CN       101027513 A      8/2007
(Continued)

OTHER PUBLICATIONS

Machine translation of EP0445904 (Year: 1991).*
(Continued)

*Primary Examiner* — Natalie Huls
(74) *Attorney, Agent, or Firm* — Morgan, Lewis & Bockius LLP

(57) ABSTRACT

Sensor for high-pressure line and method for manufacturing thereof. The sensor detects parameters or properties of fluid conducted in a high-pressure line while maintaining the high pressure of the fluid. The sensor includes an inner tube extending concentrically in the outer tube that together form a tube and at least one groove which extends in the inner surface of the outer tube or in the outer surface of the inner tube in a longitudinal direction, at least one signal line arranged in the groove, and at least one pick-up element connected to the signal line and arranged at least in the groove or in at least one recess which is provided at least in the outer surface of the inner tube or in the inner surface of (Continued)

the outer tube in addition to the at least one groove. The outer tube is in frictional connection with the inner tube.

21 Claims, 10 Drawing Sheets

(51) Int. Cl.
  *B21C 37/15* (2006.01)
  *G01M 5/00* (2006.01)
(52) U.S. Cl.
  CPC ........ *G01M 5/0025* (2013.01); *G01M 5/0041* (2013.01); *G01M 5/0066* (2013.01)

(56) References Cited

U.S. PATENT DOCUMENTS

| | | | |
|---|---|---|---|
| 5,343,738 A * | 9/1994 | Skaggs | F16L 11/121 |
| | | | 138/113 |
| 6,463,813 B1 | 10/2002 | Gysling | |
| 6,634,388 B1 * | 10/2003 | Taylor | B29C 63/34 |
| | | | 138/104 |
| 7,770,602 B2 * | 8/2010 | Buschhoff | F16L 9/18 |
| | | | 138/114 |
| 8,117,882 B2 | 2/2012 | Berg | |
| 9,121,962 B2 * | 9/2015 | Madhavan | G01V 11/002 |
| 10,724,658 B2 * | 7/2020 | Rosen | H05K 3/107 |
| 2009/0157092 A1 * | 6/2009 | Blumenkranz | A61B 34/30 |
| | | | 606/130 |
| 2010/0012217 A1 * | 1/2010 | Herbst | F16L 9/18 |
| | | | 138/143 |
| 2011/0220237 A1 * | 9/2011 | Okamoto | B21C 37/154 |
| | | | 138/140 |
| 2016/0161042 A1 * | 6/2016 | Green | G01M 3/18 |
| | | | 138/130 |
| 2016/0312924 A1 * | 10/2016 | Kolarski | F16L 53/37 |
| 2018/0095455 A1 * | 4/2018 | Silva | E21B 17/01 |
| 2019/0346071 A1 * | 11/2019 | Hedblom | F16L 9/17 |
| 2020/0130035 A1 * | 4/2020 | Rauffmann | B21C 37/154 |

FOREIGN PATENT DOCUMENTS

| | | | | |
|---|---|---|---|---|
| CN | 101087665 A | 12/2007 | | |
| CN | 101776184 A | 7/2010 | | |
| CN | 102606841 A | 7/2012 | | |
| DE | 19963786 A1 | 7/2001 | | |
| DE | 10018665 A1 | 10/2001 | | |
| EP | 0445904 | * | 3/1991 | ............. F02M 55/02 |
| EP | 1794486 B1 | 6/2011 | | |
| WO | 2006/034724 A1 | 4/2006 | | |

OTHER PUBLICATIONS

Machine translation of CN102606841 (Year: 2012).*
International Search Report and Written Opinion dated Feb. 24, 2017, issued in corresponding International Application No. PCT/EP2016/081539.
International Preliminary Report on Patentability dated Jun. 19, 2018, issued in corresponding International Application No. PCT/EP2016/081539.
Office Action dated Sep. 16, 2020 in European Application No. 16822150.5.
Notification of First Office Action issued in corresponding Chinese Patent Application No. 201680074499.8, dated Jul. 25, 2019.

* cited by examiner

SENSOR FOR A HIGH-PRESSURE LINE, AND METHOD FOR PRODUCING SAME

The present invention relates to a sensor for a high pressure line and a method for manufacturing thereof.

In many fields of technology, such as in high-pressure technology and in the chemical industry, lines or tubings are used, which are exposed to fluids with very high pressures and which must withstand these high pressures in the long term. One has to differentiate between static, i.e. constant in time and space, and dynamic, i.e. varying in time and/or pressure, pressure loads of the lines. In many technical fields of application, the pressure-bearing components typically are exposed to a pressure load varying in time and space, partly also to a periodically pulsating pressure load, such that depending on the load level the pressure bearing components are subject to significantly higher requirements in terms of pressure resistance when compared to components under static pressure load. For the same design this results in the components bearing a dynamic pressure to have a faster wear. Thus, they must be replaced more often than this is the case for components under a static pressure load.

While the static pressure resistance of components primarily depends on the mechanical characteristics such as yield strength and tensile strength of the material used, for the dynamic pressure resistance further significant quantities have to be considered, such as the ductility (elongation) of the material, the depth of already existing cracks in the wall of the component, the degree of purity, the microstructure and the surface quality.

Failure of tubes and other components usually occurs as a result of a critical growth of a crack, for example by a crack propagating from the inner surface of the tube to the outer surface of the tube. In this process, the crack may be generated by local stress concentrations, for example at material defects in the form of lattice defects and at rough surfaces due to stress peaks, or already existing cracks continue to propagate due to the pressure load. Consequently, the wear of dynamically pressure loaded components is inter alia determined by a growth of cracks per pressure burst as well as the material characteristics, wherein a good surface quality may considerably decrease the probability of crack formation.

To achieve a high pressure resistance in particular of tubes which during use are exposed to a dynamic pressure loading, the materials of the tubes to be manufactured are selected to optimize the above mentioned key factors which are responsible for the pressure resistance. In addition, frequently a subsequent change of the material characteristics is carried out, in particular by an autofrettage.

While in the meantime high-pressure lines are available, which have a pressure resistance of the tubes of at least 15000 bar, there is still a lack of suitable sensors which can detect parameters of the fluid acting on the high-pressure line or the high-pressure tube. However, for industrial handling in processes, such as manufacturing processes, it is necessary that suitable sensors are available. On the other hand, it is an object of the present invention to provide a sensor for a high pressure line, which is suitable to detect parameters or characteristics of a fluid guided in the high-pressure line, wherein the sensor itself withstands the high pressures of the fluid.

In addition, it is an object of the present invention to provide a method for manufacturing a sensor which eliminates at least one of the aforementioned disadvantages.

At least one of the above objects according to the invention is solved by a sensor for a high-pressure line having an outer tube of metal with an outer surface, an inner surface, an outer diameter and an inner diameter, an inner tube made of metal with an outer surface, an inner surface, an outer diameter and an inner diameter, wherein the inner tube extends concentrically in the outer tube, so that the inner tube and the outer tube together form a tube, and wherein an overall wall thickness of the tube measured as half of the difference between the outer diameter of the outer tube and the inner diameter of the inner tube is equal to or larger than the inner diameter of the inner tube, at least one groove extending in a longitudinal direction of the tube in the inner surface of the outer tube or in the outer surface of the inner tube, at least one signal line placed in the groove, at least one pick-up element connected to the signal line, wherein the pick-up element is placed at least in the groove or in at least one recess provided in addition to the at least one groove in the outer surface of the inner tube or in the inner surface of the outer tube, and wherein the outer tube is frictionally connected to the inner tube.

For the purposes of the present invention, in an embodiment, a high-pressure line is understood to mean a line which withstands pressures of 15,000 bar or more, in an embodiment of 18,000 bar or more, and in another embodiment of 22,000 bar or more.

The sensor for such a high-pressure line according to the present application comprises a tube which consists of an outer tube and an inner tube, wherein the inner tube concentrically extends in the outer tube and at least one pick-up element between the inner tube and the outer tube, wherein the pick-up element is connectable to an electronic device via a signal line belonging to the sensor. The pick-up element may also be placed in the groove or, alternatively, may be placed in an additional recess adjoining the groove, either in the outer surface of the inner tube or in the inner surface of the outer tube. Embodiments are also feasible, in which the sensor extends both in the groove and in a recess adjoining the groove.

This signal line is also arranged between the inner tube and the outer tube. For receiving the signal line, a groove is provided, which is introduced either into the outer surface of the inner tube or into the inner surface of the outer tube so that it extends substantially in the longitudinal direction of the tube. However, embodiments are also feasible in which both the outer surface of the inner tube and the inner surface of the outer tube each have a groove. Conveniently, the two grooves are arranged at the same circumferential position, so that a larger space to receive the signal line is formed.

Frictional connections basically arise by the application of forces, for example in the form of compressive forces or frictional forces. The cohesion of the frictional connection is ensured purely by the force acting. In order to provide the required pressure resistance of the tube which forms an elementary part of the sensor, the tube formed by the inner tube and the outer tube is a so-called high pressure tube whose overall wall thickness, which is calculated as half the difference between the outer diameter of the outer tube and the inner diameter of the inner tube, is equal to or larger than the inner diameter of the inner tube.

In a further embodiment of the present invention, after the inner tube and the outer tube have been drawn together through a first drawing die, the tube to be manufactured has an overall wall thickness, which is calculated as half the difference between the outer diameter of the outer tube and the inner diameter of the inner tube, of at least one third of the outer diameter of the outer tube. Such a wall thickness provides a great stability of the tube and thus makes it possible to use the tube as a high-pressure tube, such that it can withstand pressures beyond 10,000 bar without rupture.

Since the tube as a component of the sensor according to the invention is assembled of the inner tube and the outer tube, it is also essential that the outer tube is frictionally connected to the inner tube, so that the inner tube when pressurized does not experience any excessive stretching, for example, into a gap between the inner tube and the outer tube, which eventually leads to a rupture of the tube and thus to the destruction of the sensor. It is expedient if, in an embodiment of the invention, the frictional connection between the outer tube and the inner tube is provided over the entire length of the tube.

In an embodiment of the invention, the inner tube is a strain-hardened tube having a tensile strength of 900 N or more. Such a tensile strength is required for the inner tube to withstand the high pressures in the areas where grooves and/or recesses are provided in the outer surface of the inner tube or in the inner surface of the outer tube. In these areas, the inner tube may stretch to a certain extent. In an embodiment of the invention, the tensile strength of the strain-hardened inner tube is 1050 N or more.

In this case, the tensile strength is understood to be the maximum mechanical tensile stress which the material of the inner tube can withstand before it breaks or ruptures.

In an embodiment of the method according to the invention, a material of at least the inner tube or the outer tube is selected from a group consisting of an unalloyed steel, a low-alloy steel and a high-alloy steel or a combination thereof. In an embodiment, the material is a high alloy steel. In a further embodiment, at least the inner tube or the outer tube is made of HP 160.

In high-pressure technology, different metal materials are used for the manufacturing of tubes and other components. These are mainly unalloyed, low-alloy and high-alloy steels. Particularly a high dynamic pressure resistance is achieved in tubes or other components made of high-alloy steel, which has been strain-hardened or tempered and burnished afterwards. HP 160 is a high-strength nitrogen-alloyed austenitic stainless steel, which stands out from the standard materials regarding an improved corrosion resistance, a high degree of purity, good formability and the ability to carry out an autofrettage of this material up to 12,000 bar. Due to its chemical composition and high purity, HP 160 has excellent resistance to intergranular corrosion and to hydrogen embrittlement. The high molybdenum content provides good resistance to pitting and contact corrosion as well as stress corrosion cracking. Thus, HP 160 is a preferred material for the manufacturing of tubes with a high dynamic pressure resistance.

In an embodiment of the present invention, the inner tube is corrosion resistant. This feature is advantageous for use in high pressure technology because incipient corrosion, i.e. a progressive decomposition of the inner tube, would lead to an impairment of its pressure resistance.

In an embodiment of the present invention, the inner tube and the outer tube are made of the same material. As a result of this, the inner tube and the outer tube form a very stable connection with one another as a result of the frictional connection between the inner tube and the outer tube brought about by the common drawing through the first drawing die. In case of the same material, and under the microscope, the same lattice structure in the microstructure is present both in the inner tube and in the outer tube so that the lattice structures combine very well with one another on the outer shell surface of the inner tube and on the inner shell surface of the outer tube.

To detect certain values or characteristics of a fluid which is guided in the tube with measurement pick-up elements arranged between inner tube and outer tube, the inner tube must have a certain elongation, for example, to be able to transmit a force into the space between inner tube and outer tube. This is particularly necessary if the sensor according to the invention is a pressure sensor. Compared with the inner tube, the outer tube may only have a lower elongation in order to be able to absorb an elongation of the inner tube, or to withstand the elongation and to give the tube the required overall compressive strength. Therefore, in an embodiment of the invention, the inner tube has a larger elongation than the outer tube. In an embodiment of the invention, the elongation of the inner tube is 20% or more.

In an embodiment of the invention, the inner diameter of the inner tube is 10 mm or less. It is understood that the smaller the inner diameter of the inner tube is, and thus the inner diameter of the entire tube, the higher is the pressure which the tube can withstand. Therefore, in an embodiment of the invention, the inner diameter of the inner tube is 2 mm or less, and in another embodiment is 1.5 mm or less.

In a further embodiment of the invention, the overall wall thickness of the inner tube and the outer tube is at least 3 mm. It is understood that the compressive strength of a tube at an assumed inner diameter of the inner tube also increases with increasing wall thickness. Therefore, in an embodiment of the invention, the overall wall thickness of the tube is 6 mm or more.

Also, the outer configuration of the groove in the outer surface of the inner tube or in the inner surface of the outer tube may in an embodiment have an influence on the pressure resistance of the tube and thus of the sensor. In an embodiment of the invention, the at least one groove has a width in a circumferential direction of the outer tube or the inner tube and a depth in a radial direction of the outer tube and the inner tube, wherein the width is smaller than the depth of the groove.

In an embodiment of the invention, the sensor is a temperature sensor, wherein the sensor is formed by a thermometer. In a further embodiment of the invention, the sensor is a vibration sensor, wherein the sensor is formed by an acceleration sensor. In yet another embodiment, the sensor is a strain sensor, which detects an expansion of the inner tube in order, for example, to be able to signal an overload of the tube early. In such an embodiment, the sensor is, for example, a strain gauge. In yet another embodiment, the sensor is a pressure sensor, wherein the sensor is formed, for example, by a force pick-up element, in particular by a strain gauge.

In an embodiment, when the sensor is a pressure sensor with the at least one sensor being a force pick-up element, the force pick-up element engages the inner tube in order to detect a force applied to the inner tube due to the pressure of a fluid guided in the tube.

In an embodiment of the invention, the sensor has three grooves extending in a longitudinal direction of the tube at least in the inner surface of the outer tube or in the outer surface of the inner tube, wherein in each of the three grooves at least one signal line is arranged, wherein a force pick-up element is arranged at least in one of the three grooves or in three recesses adjacent to each of the grooves and is connected to at least one of the signal lines and wherein the pick-up elements are arranged in the longitudinal direction of the tube such that there is a cross-sectional plane perpendicular to the longitudinal direction of the tube, which intersects each of the three pick-up elements. While such a configuration is particularly useful in a pressure sensor, other sensors may have such a geometric configuration, in which case the sensor is optionally not a force pick-up element.

In an embodiment, with this arrangement as a pressure sensor, the forces acting on the inner tube caused by pressurization of the guided fluid can be detected in three spatial directions of the tube and from these three measurements the internal pressure of the fluid in the tube can be deduced in a sufficient manner.

It is understood that in an embodiment of the invention, the three pick-up elements are spaced apart by 120° in the circumferential direction of the tube.

In a further embodiment of the invention, in which the sensor is a pressure sensor, the sensor additionally has a thermometer as an additional pick-up element, wherein the thermometer is placed at least in a groove or in at least one recess, which is introduced at least in the outer surface of the inner tube or in the inner surface of the outer tube. Such a thermometer allows temperature compensation of the pressure measurement. It is expedient if the thermometer is in engagement with the outer surface of the inner tube to detect the temperature of the inner tube and thus the temperature of the fluid.

At least one of the above objects is also achieved by a method for manufacturing a sensor for a high pressure line, comprising the steps of providing an outer tube of metal with an outer surface, an inner surface, an outer diameter and an inner diameter, providing an inner tube of metal with an outer surface, an inner surface, an outer diameter and an inner diameter, wherein the outer diameter of the inner tube is smaller than the inner diameter of the outer tube and wherein an overall wall thickness measured as one-half of a difference between the outer diameter of the outer tube and the inner diameter of the inner tube is equal to or greater than that the inner diameter of the inner tube, introducing at least one groove extending in a longitudinal direction of the tube at least in the inner surface of the outer tube or in the outer surface of the inner tube, arranging at least one signal line in the groove, arranging at least one sensor connected to the signal line at least in the groove or in at least one recess placed at least in the outer surface of the inner tube or in the inner surface of the outer tube, inserting the inner tube into the outer tube, so that the inner tube extends in the outer tube, and drawing the inner tube and the outer tube together through a first drawing die with an inner tool surface forming the outer surface of the outer tube, wherein a tool diameter of the inner tool surface of the first drawing die is selected such that by the drawing the inner diameter of the outer tube is reduced such that after drawing the outer tube is in frictional connection with the inner tube, so that the inner tube and the outer tube together form a tube.

Such a method, in which the joining of the outer tube and the inner tube into the finished tube of the sensor is carried out by a common drawing through a drawing die ensures the necessary frictional connection between the inner tube and the outer tube over its entire length in the axial direction. The manufacturing method according to the invention also makes it possible to arrange both the signal line and the sensor in a groove and possibly in an adjoining recess before joining or connecting the inner tube and the outer tube.

The method according to the invention for manufacturing a sensor for a high-pressure line has some advantages over the methods known from the prior art for manufacturing high-pressure resistant tubes:

(1) During the common drawing of the inner tube and the outer tube together through the drawing die, a frictional connection is generated between these two tubes, which prevents a shift of the inner tube and the outer tube in the axial direction, while there is a form fit in the radial direction. A permanently stable and intact connection between the inner tube and outer tube plays an important role, in particular in case of the application of such a so-called double-walled tube in high-pressure technology. If this permanently stable and intact connection is not provided, for example, by an existing air gap or clearance between the inner tube and the outer tube or a lack of frictional connection between the two tubes, this can lead to an easier rupture of the inner tube by propagation of cracks once the double-walled tube is exposed to a high pressure load.

(2) The manufacturing of a double-walled tube, i.e. a tube consisting of an outer tube and an inner tube, according to the present invention results in that the tube manufactured on the one hand has a sufficiently large wall thickness and on the other hand at the same time has a very high surface quality of the outer shell surface and in particular the inner shell surface. Only fulfilment of these two requirements allows a sufficiently high level of protection of the tube to be manufactured against rupture when the tube is exposed to pressures beyond 12,000 bar. The large wall thickness, which results from the sum of the wall thicknesses of the outer tube and the inner tube after being drawn through the first drawing die, increases the pressure resistance of the tube, since cracks on the inner shell surface must propagate over a longer distance until they reach the outer shell surface. In addition, the frictional connection between inner tube and outer tube ensures that these cracks do not propagate along the contact surface between inner tube and outer tube and bring the inner tube in the worst case to rupture. Further, the common drawing of the inner tube and the outer tube in an embodiment is carried out in the cold state of the raw material, i.e. the incoming hollow. As a result, the strength and the dimensional accuracy and surface quality of the tubes to be manufactured is increased when compared to methods in which the tubes to be manufactured are heated. Temperature gradients due to an inhomogeneous heating of the tube, which lead to a distortion in the metal microstructure of the tube, and material defects or lattice defects that expand as a result of an increase in temperature do not occur during cold forming of tubes. By cold forming on a drawing bench, highly precise tubes of high surface quality can be manufactured, but only up to a certain maximum wall thickness. If the wall thickness of the tube to be drawn exceeds this maximum wall thickness, the surface quality decreases drastically. As according to the method of the invention, the inner tube and the outer tube are manufactured separately from each other before they are drawn together through the drawing die, it is possible to manufacture the inner surface of the inner tube with a high surface quality and still to provide the wall thickness of the tube required to have a high pressure resistance. Accordingly, the method according to the invention by the combination of the requirements of a large wall thickness of the tube to be manufactured on the one hand and a high surface quality of the inner surface of the tube to be manufactured on the other hand, is particularly suitable for manufacturing a tube with significantly improved dynamic pressure resistance under high pressures.

To provide the frictional connection, the outer dimension and the inner dimension of the outer tube prior to the drawing through the first drawing die, the outer dimension and the inner dimension of the inner tube prior to the drawing through the first drawing die as well as the tool dimension of the inner tool surface of the first drawing die must be matched.

Here, the common drawing of the outer tube and the inner tube together through the first drawing die may be described as a drawing of the outer tube through the first drawing die and over a drawing core formed by the inner tube.

It has been shown that by this method, a tube with the outer tube and the inner tube of metal can be manufactured, in which a signal line and a pick-up element can be integrated.

In an embodiment of the invention, the outer tube and/or the inner tube are made of steel or stainless steel. It is understood that in this case the hollows, which are used for providing or manufacturing the outer tube or the inner tube, are also made of steel or stainless steel. It is further understood that in principle the material of the outer tube and/or the inner tube can be selected arbitrarily, for example from a group consisting of carbon steel, manganese steel, zirconium and copper.

While in an embodiment of the invention the outer tube and the inner tube are made of the same material, in an alternative embodiment the outer tube and the inner tube have mutually different materials. The latter has the advantage that specifically different properties of the materials for the outer tube and the inner tube can be provided, which can be arbitrarily combined with one another in order to obtain a tube adapted to a specific application.

In an embodiment of the invention, the steps of inserting the inner tube into the outer tube and drawing the inner tube and the outer tube together through a first drawing die are performed in exactly the stated order, i.e. one after the other. In contrast, there is no order or the provision of the outer tube and for the provision of the inner tube which would be essential for the invention.

During provision of the outer tube or the inner tube, for example by forming a hollow into the outer tube or into the inner tube, in an embodiment a definition of the cross-sectional area of the respective tube can be carried out.

It is crucial for the manufacturing method according to the invention that the outer tube provided has an inner diameter matched to the outer diameter of the inner tube provided, such that the inner tube can be inserted into the outer tube with comparatively small forces in order to assemble the tube from the outer tube and the inner tube.

During drawing through the first drawing die, it is first necessary to provide the required frictional connection. In an embodiment of the invention, this frictional connection requires that the outer diameter of the inner tube is reduced by the drawing step, i.e. the inner tube is compressed. For this purpose, in an embodiment of the invention by drawing the inner tube and the outer tube together through the first drawing die a wall thickness of the outer tube and the inner diameter of the outer tube is reduced such that the outer diameter of the inner tube is reduced simultaneously by at least 0.01 mm. A reduction of the outer diameter of the inner tube by 0.15 mm results in a good frictional connection between the inner tube and the outer tube.

However, in an embodiment it is advisable that during the common drawing of the inner tube and outer tube, the inner tube is not deformed too much by the drawing process. In an embodiment, when the inner tube and the outer tube are drawn together, a wall thickness of the outer tube and the inner diameter of the outer tube are reduced by the first drawing die such that at the same time the outer diameter of the inner tube is reduced by at most 0.3 mm. The latter on the one hand in order to avoid that the spaces created by the groove and possibly by the recess for the signal line and sensor installation are reduced to an extend that the signal line and/or the pick-up element are damaged by the drawing. On the other hand, however, it must be avoided that the forming by the first drawing die adversely affects the surface characteristics of the inner surface of the inner tube.

Therefore, in an embodiment of the invention, the tool diameter of an inner tool surface of the first drawing die, the outer diameter and the inner diameter of the outer tube before drawing, and the outer diameter and the inner diameter of the inner tube before drawing are selected such that by drawing of the inner tube and the outer tube together through the first drawing die the inner diameter of the inner tube is not reduced.

In an embodiment of the invention, providing the inner tube and introducing the groove into the outer surface of the inner tube comprises the steps of providing a hollow of metal, drawing the hollow through a second drawing die with an inner tool surface forming the outer surface of the inner tube into the inner tube, wherein a tool diameter of the inner tool surface of the second drawing die is selected such that the outer diameter of the inner tube is smaller than the inner diameter of the outer tube, and wherein the inner tool surface of the second drawing die has at least one inwardly projecting portion such that the at least one groove extending in the longitudinal direction of the inner tube is drawn into the outer surface of the inner tube.

It is essential in order to be able to provide a tube with an integrated sensor system and/or an integrated signal line that at least one signal line and at least one sensor can be placed between the outer tube and the inner tube. For this purpose, in an embodiment of the invention, a groove is introduced either in the inner wall of the outer tube or in the outer wall of the inner tube or even in both when forming a hollow into the outer tube or into the inner tube by drawing. It is understood that this groove extends in the longitudinal direction of the tube and thus at least provides the space for a signal line.

If a groove for the signal line is to be provided in the outer wall of the inner tube, then the inner tool surface must have at least one section projecting inwardly with the aid of a second draw die which defines the outer surface of the inner tube, such that the groove extending in the longitudinal direction of the inner tube is drawn into the outer surface of the inner tube.

If the groove is alternatively or additionally drawn into the inner wall of the outer tube, then the drawing of the outer tube is carried out by means of a third drawing die, whose inner tool surface forms the outer surface of the outer tube, and a drawing core, whose outer tool surface forms the inner surface of the outer tube. In such an embodiment, the outer tool surface of the drawing core has at least one outwardly projecting portion such that, during drawing, this portion draws the groove into the inner surface of the outer tube. In contrast, in such an embodiment, drawing of a hollow of a metal through a drawing die, which in the context of the present application is referred to as a second drawing die, into the inner tube, in an embodiment of the invention can be carried without a drawing core.

While in an embodiment of the invention exactly one groove is provided in the inner surface of the outer tube and/or in the outer surface of the inner tube, a plurality of grooves can be drawn into the outer tube or into the inner tube. It is understood that in such an embodiment, the outer tool surface of the drawing core for an arrangement of the grooves in the inner surface of the outer tube has a corresponding number of outwardly projecting portions. In an embodiment, exactly three grooves are drawn into the inner surface of the outer tube. These grooves in an embodiment have a distance in the circumferential direction of 120° from each other. Likewise, if a plurality of grooves are provided in the outer surface of the inner tube, the inner tool surface of the second drawing die has a plurality of inwardly projecting portions. In an embodiment, exactly three grooves are drawn into the outer surface of the inner tube. These grooves in an embodiment have a distance in the circumferential direction of 120° from each other.

While the outwardly or inwardly projecting portions in the outer tool surface of the drawing core or the inner tool surface of the drawing die may have any profile, in an embodiment of the invention, the cross sectional profile of the respective projecting portion is formed by a divided circle. Such groove having a shape of a divided circle has the advantage that the corresponding tool can be manufactured easily and has a long service life.

In an embodiment of the invention, the groove has a width in a circumferential direction of the outer tube or the inner tube and a depth in the radial direction of the outer tube or the inner tube, the width being smaller than the depth. The corresponding tool having the negative shape has a high stability. In this case, the width in the circumferential direction is understood to be the extension of the groove in the outer surface or in the inner surface along the contour of the outer surface or the inner surface. It will be understood that in a tube of circular cross section, the width is measured along the circumference of the surface into which the groove is recessed. Accordingly, the depth of the groove is measured in a radial direction. In a tube of circular cross-section, this radial direction extends in the direction of the radius of the tube.

In order not to unnecessarily degrade the finished tube by the grooves in one of the tube's components, in an embodiment of the invention, at least the outer tube is machined prior to the step of inserting the inner tube into the outer tube so that at least one recess is formed in the inner surface of the outer tube is, wherein the recess adjoins at least one groove, or the inner tube is machined, so that at least one recess in the outer surface of the inner tube is formed, wherein the recess adjoins at least one groove. In this way, when viewed in the longitudinal direction of the tube at certain points, i.e. at one or more positions in the longitudinal direction of the tube, a receiving space in particular for receiving a pick-up element is created. Thus, the width of the groove can be made smaller.

In an embodiment of the invention, the chip forming machining is carried out by a method selected from milling, drilling and filing or a combination thereof.

While the groove can be introduced over the entire length of the tube by means of drawing, recesses in the longitudinal direction of the tube are provided in an embodiment of the invention only at positions at which sensors must be arranged. In this way, the machining time can be reduced by the chip forming machining.

In an embodiment, a recess adjoins a groove. Adjoining or connecting the recess to the groove in the sense of the present application means that the groove and the recess in the outer surface or the inner surface form a contiguous space or a contiguous volume within the outer or inner radius.

Prior to the step of introducing the inner tube into the outer tube at least one signal line and/or a sensor are placed in the groove. Also, a plurality of signal lines may be placed in the groove, and when a plurality of grooves are provided in the outer tube and/or in the inner tube, one or a plurality of signal lines may be placed in each of the grooves.

For the purposes of the present application, a signal line is understood to be any line capable of transmitting a signal, i.e. information, from a transmitter to a receiver. Here, in an embodiment, the signal line is selected from an electrical signal line, an electromagnetic signal line, and an optical signal line, or any combination thereof. Examples of such a signal line are an insulated electrically conductive wire or an optical fibre.

In an embodiment of the invention, the signal line in the groove and/or the pick-up element in the groove and/or in the recess are glued by means of an adhesive. Such an adhesive bond fixes the pick-up element and the signal line in the groove or recess during insertion of the inner tube into the outer tube and during the drawing through the first drawing die.

As far as aspects of the invention have been described above with regard to the method for manufacturing a sensor for a high-pressure line, these also apply to a sensor for a high-pressure line manufactured by this method. As far as the sensor described has features for a high-pressure line, those can be provided by an adaptation of the method for manufacturing the sensor.

Further advantages, features and applications of the present invention will become apparent from the following description of embodiments and the associated figures.

In the figures, like elements are designated by like reference numbers.

The figures are schematic views which are not to scale. In particular, all the figures show a sensor for a high-pressure line or parts of such a sensor. To provide the required high pressure resistance, an overall wall thickness of the outer tube and inner tube as part of the sensor is equal to or greater than the inner diameter of the inner tube. The overall wall thickness of the finished tube of outer tube and inner tube is measured as one half of the difference between the outer diameter of the outer tube and the inner diameter of the inner tube.

Figure 1:
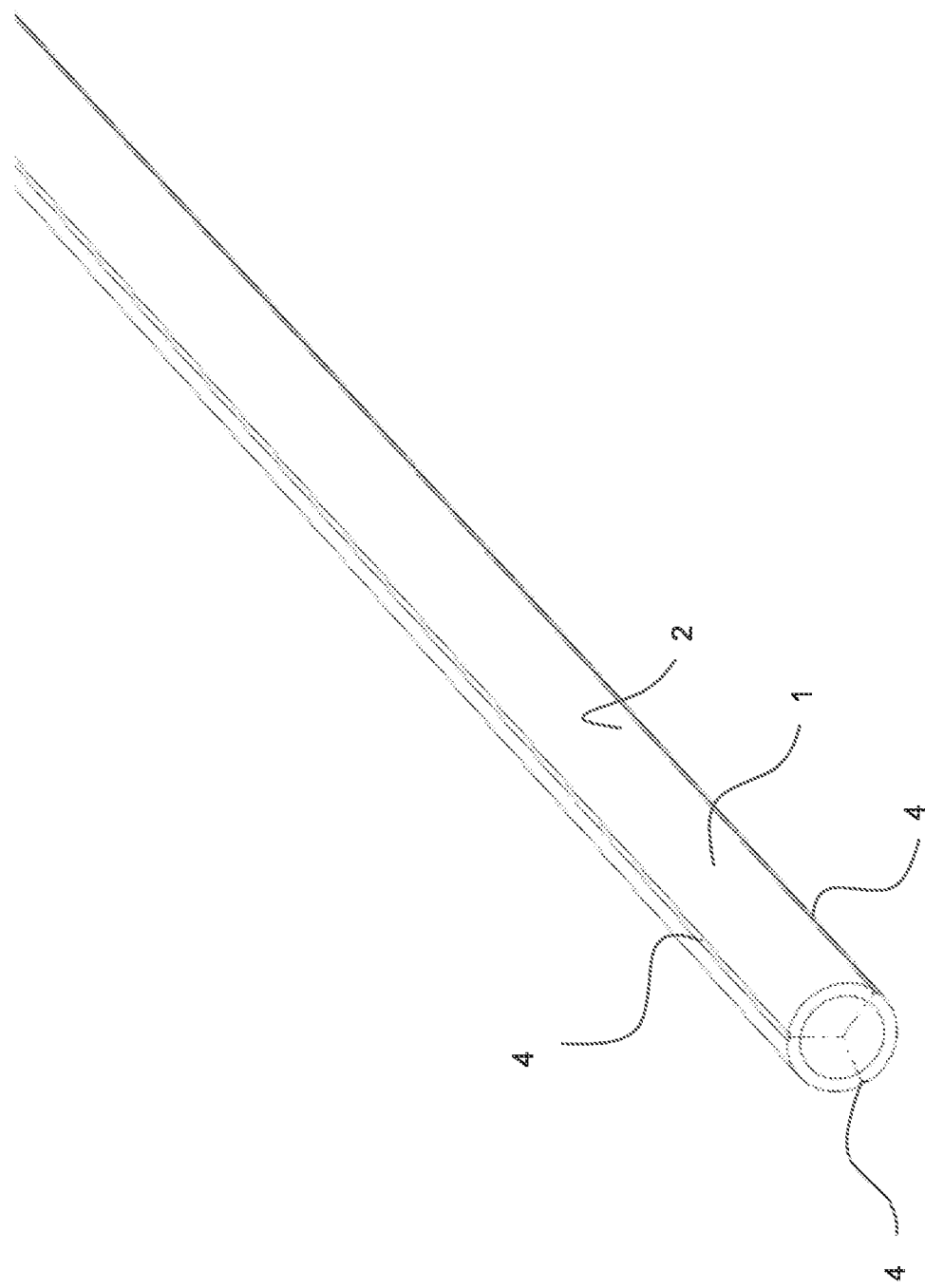
FIG. 1 shows a broken away, perspective view of an inner tube as part of an embodiment of the sensor according to the invention.

FIG. 1 shows an inner tube 1 which has three grooves 4 in its outer surface 2. These grooves 4 serve to receive a signal line 7 in a sensor comprising the inner tube 1 and an outer tube, which is denoted by the reference numeral 5 in FIG. 3.

Figure 2:
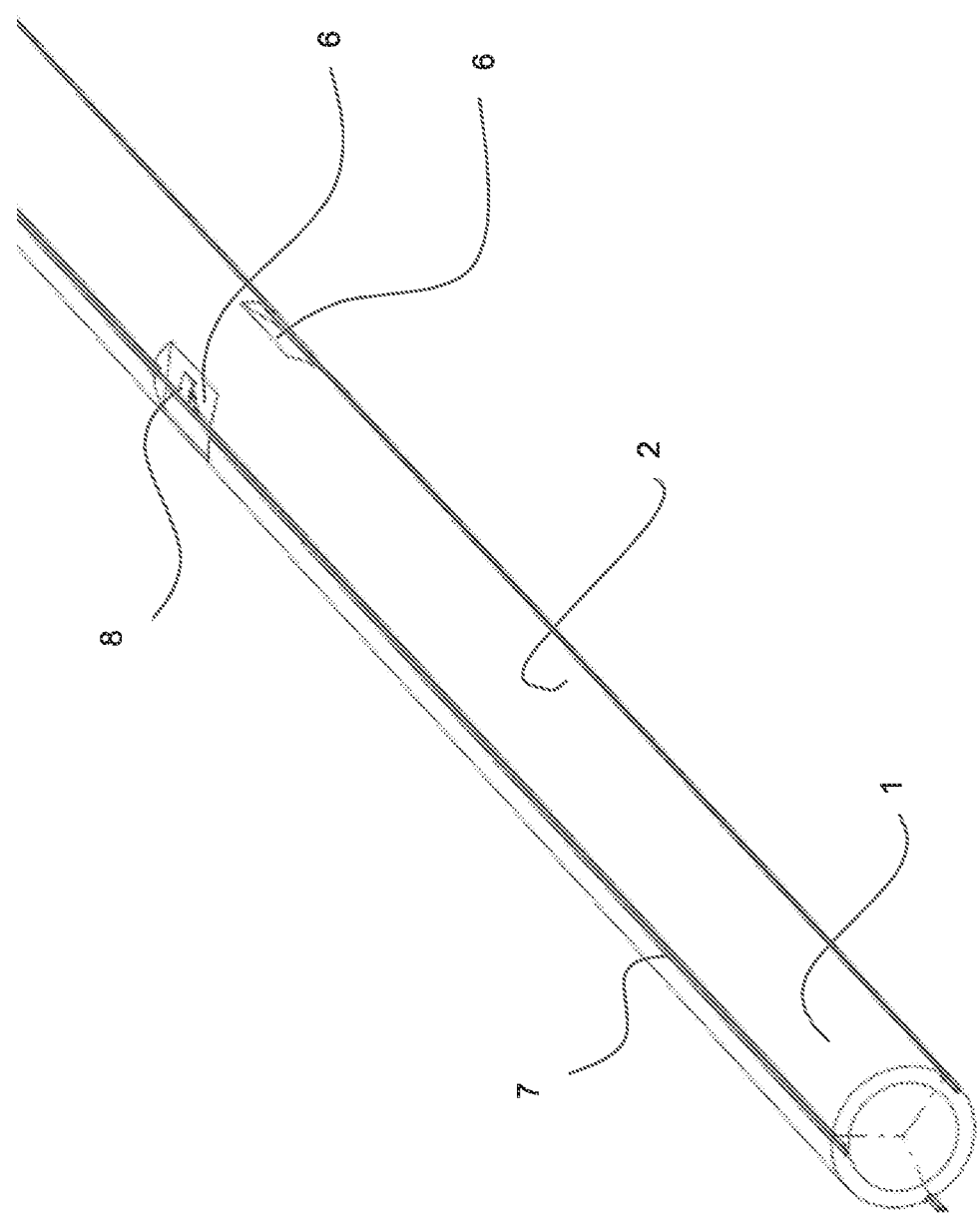
FIG. 2 shows a broken away perspective view of the inner tube of FIG. 1 with signal lines and sensors received thereon.

In the illustrated embodiment, the inner tube 1 is a cold-formed, namely cold drawn, stainless steel tube. While the grooves 4 are introduced by drawing into the outer surface 2 of the tube 1, the additional recesses 6 are milled into the outer surface 2 of the tube. These recesses are visible in FIG. 2.

Figure 7:
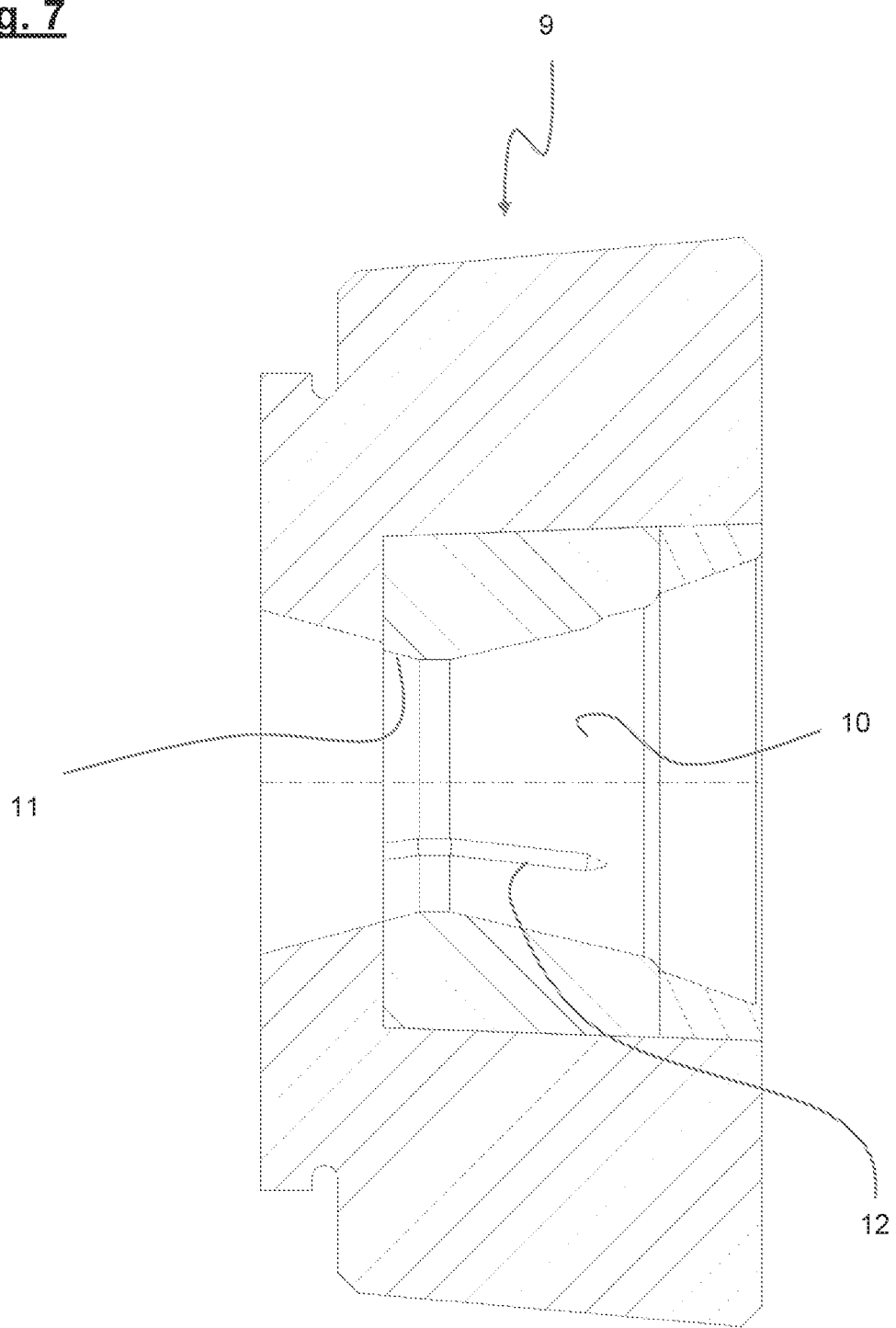
FIG. 7 shows a longitudinal cross-sectional view of an embodiment of a drawing die for manufacturing the inner tube of FIGS. 1 to 6.
Figure 8:
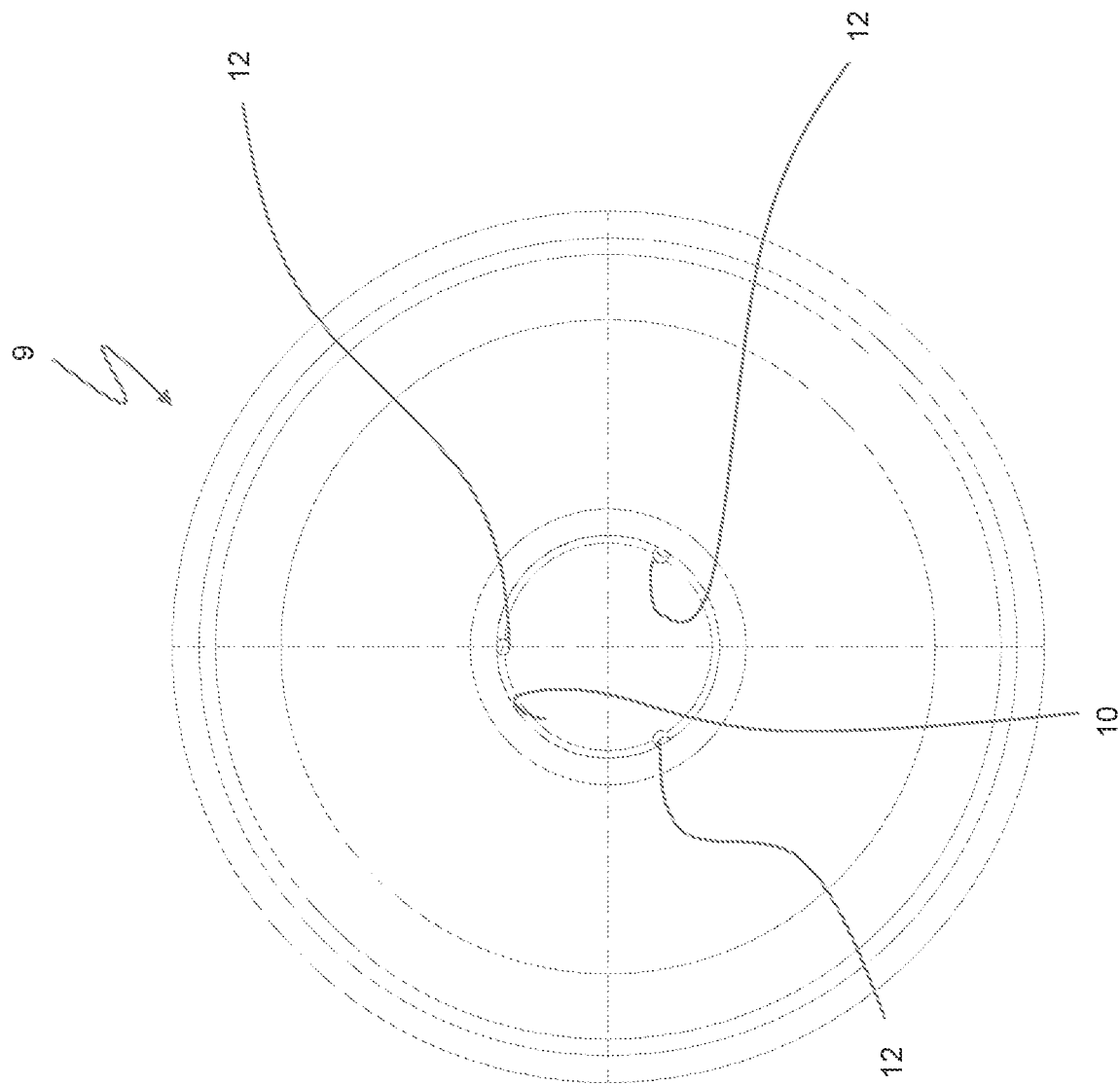
FIG. 8 shows a cross-sectional view through the drawing die of FIG. 7.

FIGS. 7 and 8 show a drawing die 9 for drawing the inner tube 1. The drawing die 9 reduces the outer diameter of an incoming hollow such that the finished drawn inner tube 1 has an outer diameter which is defined by the tool dimension of the drawing die 9. In this case, the smallest diameter of the conical inner tool surface 10 is referred to as a tool dimension in the sense of the present application. This smallest inner diameter is provided in the drawing die 9 of FIG. 7 at the point designated by reference number 11. In addition to the drawing die 9, to draw the hollow into the finished inner tube 1, a supported or flying drawing core may be used which forms the inside dimension, i.e. the inner diameter of the inner tube 1. But this is not absolutely necessary.

Figure 4:
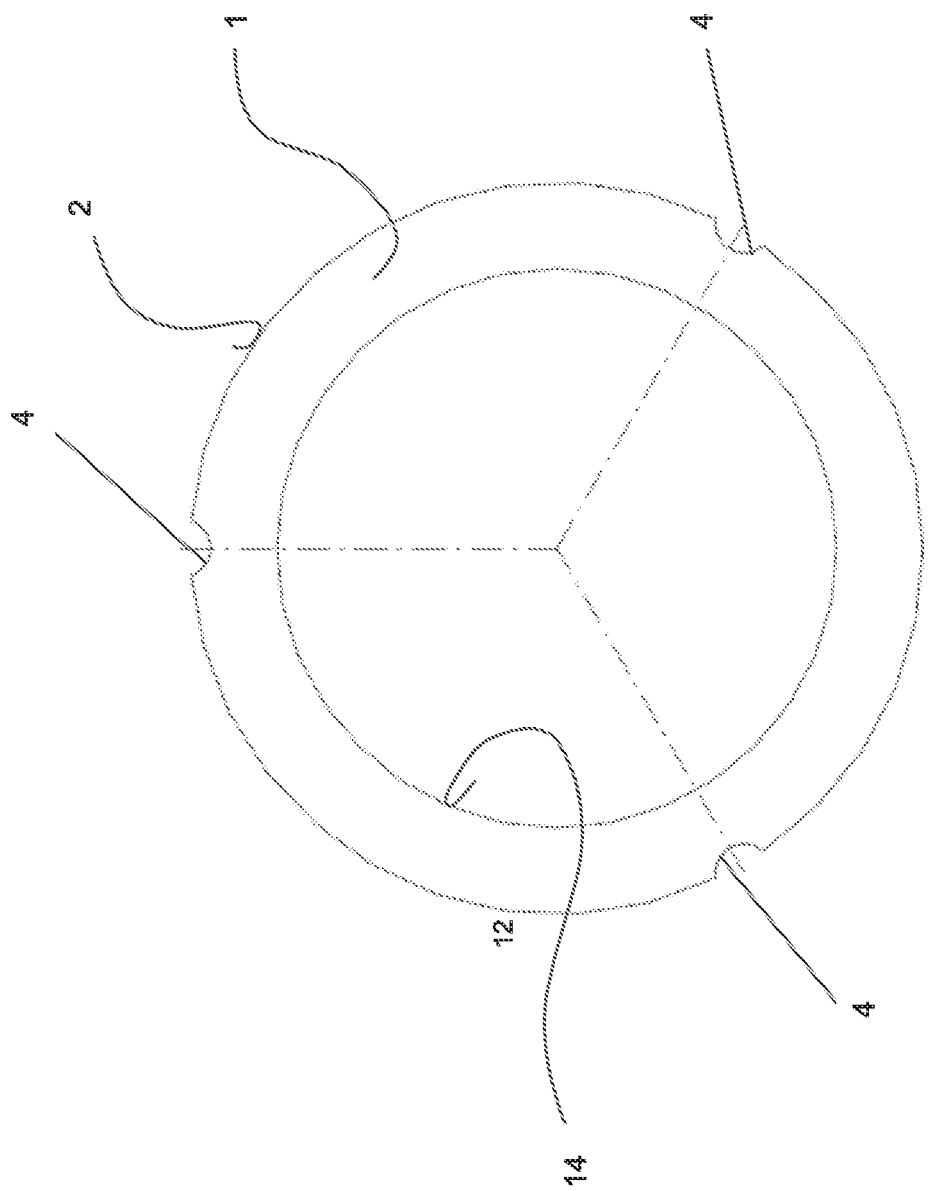
FIG. 4 shows a plan view of the end face of the inner tube of FIGS. 1 to 3.

FIG. 4 shows a cross section through the inner tube 1 in each arbitrary plane outside the recesses 6. The inner surface of the inner tube 1 has the reference number 14.

In order to draw the grooves 4 into the outer surface 2 of the inner tube 1 three projecting sections 12 are provided on the inner tool surface 10. These sections 12 projecting inwardly from the inner tool surface are spaced from each other by 120° each in the circumferential direction. Each of the sections projecting inwardly comprises a cross-section in form of a divided circle, wherein with respect to the inner tool surface 10 the divided circle of each of the sections projecting inwardly is smaller than 180°. This way the grooves to be drawn by the drawing die 9 into the outer surface 2 of the inner tube 1 have a width in the circumferential direction of the tube 1 being smaller than the depth of the grooves in a radial direction of the tube 1.

After drawing through the drawing die 9 the inner tube 1 not only comprises its outer dimension and its inner dimension, but also has three grooves 4 being spaced apart from each other by 120°.

The drawing die 9 of FIGS. 7 and 8 in the sense of the present application is denoted as the second drawing die.

Figure 5:
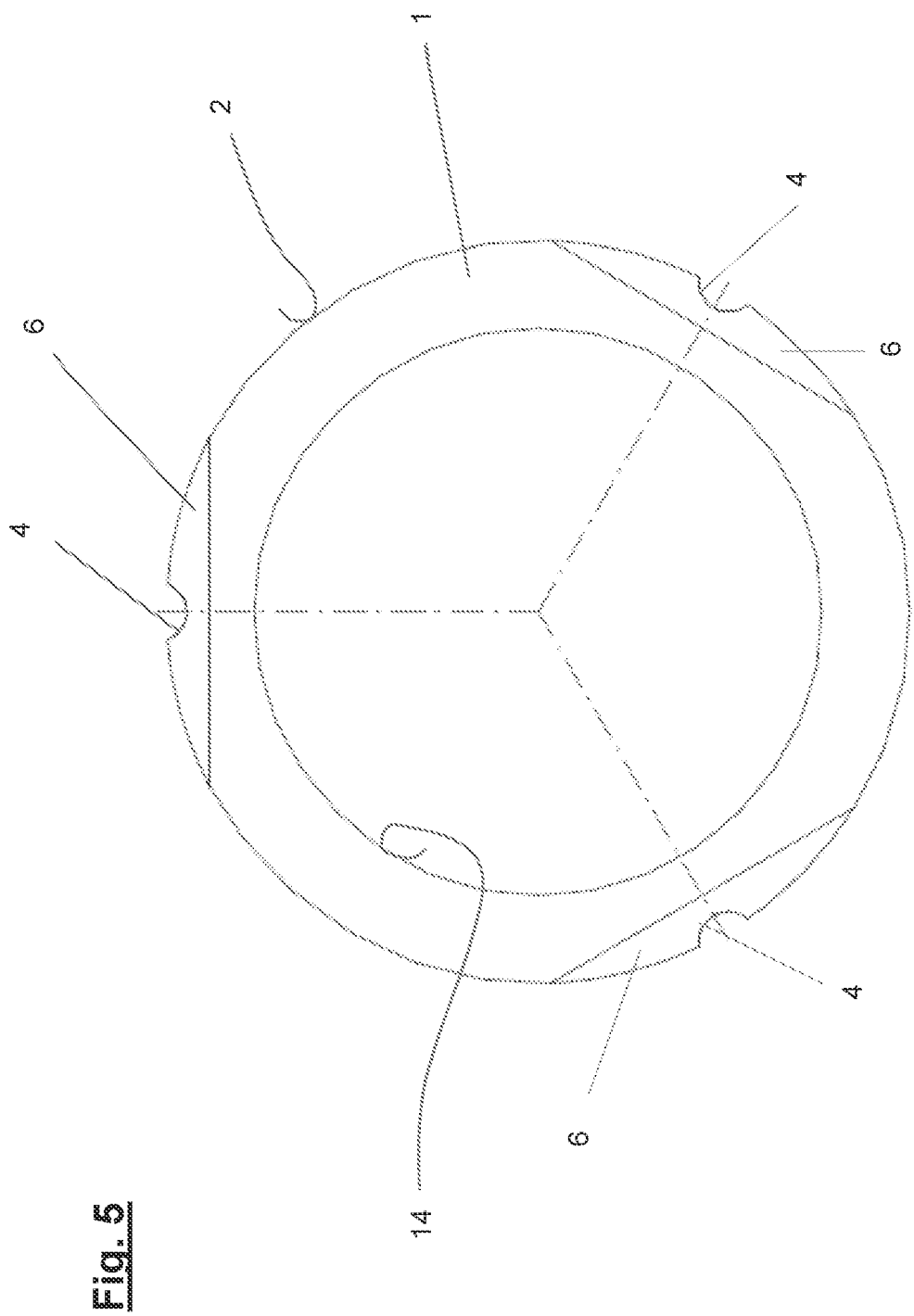
FIG. 5 shows a sectional view of the inner tube of FIGS. 1 to 3 in a plane in which pick-up elements are arranged.

After drawing the inner tube 1, the recesses 6 are additionally milled in its outer surface 2, so that they adjoin the grooves 4. FIG. 5 shows a cross-sectional view of the tube in the region of the recess 6.

In the outer surface 2 of the inner tube 1, three recesses 6 are provided, which each serve to receive a pick-up element, which is connected to a signal line 7. Only two of the recesses 6 are visible in the perspective view of FIG. 2, the other one is covered by the tube.

Each of the recesses 6 adjoins a groove 4 in the sense that the groove 4 and the recess 6 form a contiguous receiving space for the signal lines 7 and the pick-up element 8.

Next, the signal lines 7 are glued together with the pick-up elements 8 into the grooves 4 and into the recesses 6. For this bonding, it is only important that the bond is sufficiently stable to allow insertion of the inner tube 1 into the outer tube 5. In the illustrated embodiment, the grooves 4 are just sized so that they receive two signal lines 7 each.

In order to manufacture the complete sensor, it is initially irrelevant how the outer tube 5 is manufactured or provided. Typically, the outer tube 5 will also be a cold-formed stainless steel tube.

However, it is crucial that the outer diameter of the inner tube 1 is smaller than the inner diameter of the outer tube 5. In this way, the inner tube 1 can be inserted at low friction on the outer tube 5 with little force into the outer tube 5. In an embodiment, this step is carried out manually. If the inner tube 1 and the outer tube 5 have a too large friction when the inner tube 1 is inserted into the outer tube 5, the signal lines 7 and the pick-up element 8 already arranged in the grooves 4 and the recesses 6 may be damaged.

The two concentric inner and outer tubes 1, 5 are then mechanically frictionally connected to form a tube by drawing both tubes together through a drawing die on a drawing bench. Inner and outer tube 1, 5 together with the signal lines 7 and the pick-up elements 8 then form the sensor 16 for a high-pressure line according to the invention. The drawing die in the sense of the present application is referred to as the first drawing die. The first drawing die has a configuration similar to that of FIGS. 7 and 8, wherein the first drawing die has no projecting portions on the forming inner tool surface.

It is crucial for this step of the method for the manufacturing of the tube that the inner diameter of the outer tube 5 is reduced such that the inner surface of the outer tube 5 is in frictional connection with the outer surface 2 of the inner tube 1. To provide the frictional connection, it is necessary that by drawing the inner tube and the outer tube together through the first drawing die a wall thickness of the outer tube and the inner diameter of the outer tube are reduced such that the outer diameter of the inner tube is reduced by at least 0.01 mm and by not more than 0.3 mm. The upper limit of a reduction of the outer diameter of the inner tube is to prevent that during the common drawing of inner tube and outer tube together through the first drawing die the space of the grooves 4 and recesses 6 is reduced and the signal lines or the pick-up elements are damaged. In addition, a change in the inner diameter of the inner tube must be avoided in order not to change the surface characteristics of the inner surface of the inner tube and not to change the pressure resistance of the tube.

In the illustrated embodiment, the divided circle forming the groove 4 has a radius of 0.5 mm. The divided circle is embedded in the outer surface 2 of the inner tube 1 in such a way that the width of the groove, measured as a connecting distance between the two edges in a direction perpendicular to the longitudinal axis of the inner tube 1 is 1.88 mm. The depth of the groove 4 in this embodiment is then 0.7 mm measured between the deepest point of the groove and the connecting line between the two edges of the groove on the outer surface 2 and perpendicular to this connecting line.

Figure 3:
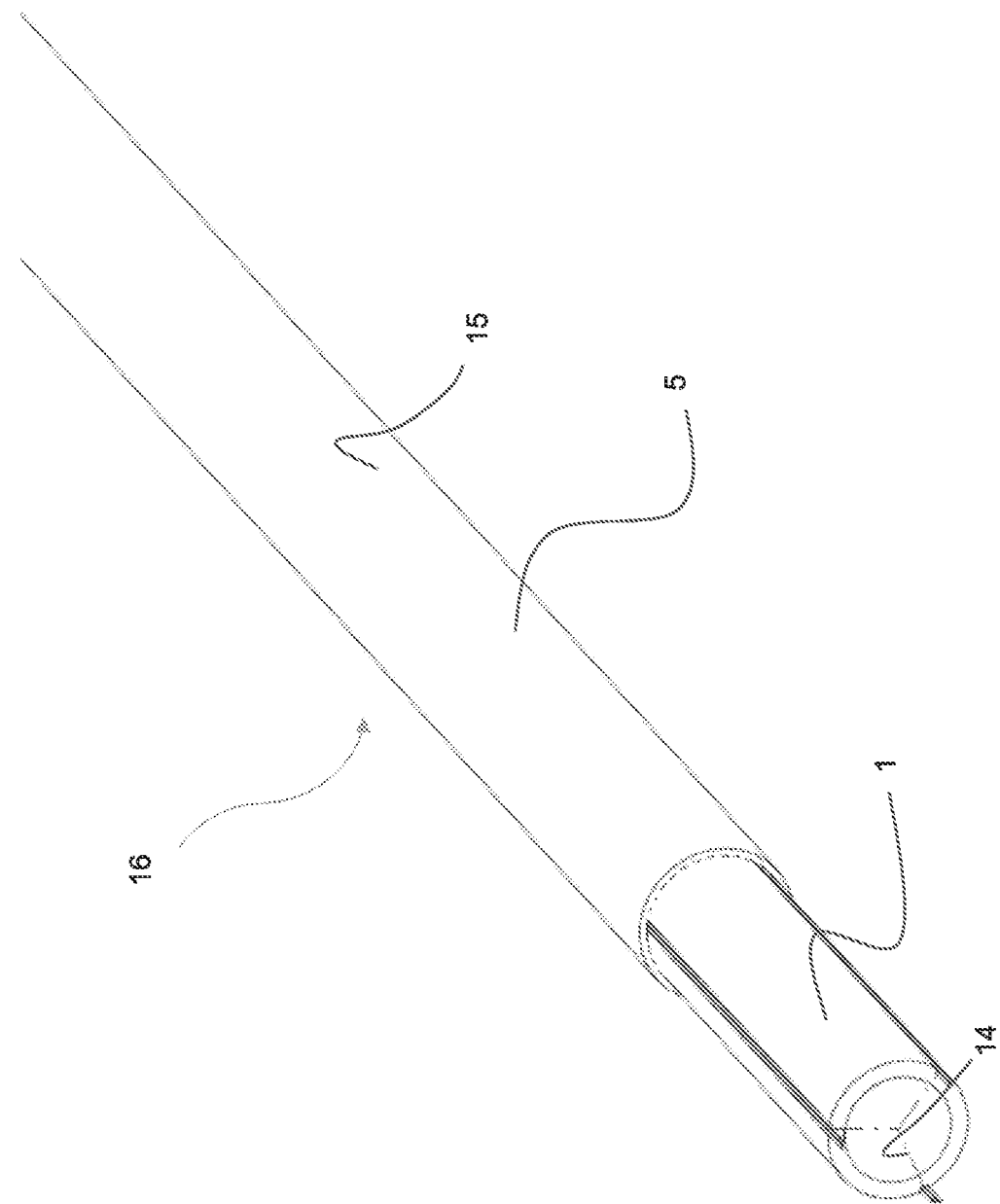
FIG. 3 shows a broken away perspective view of the inner tube of FIGS. 1 and 2 with a concentric outer tube.
Figure 6:
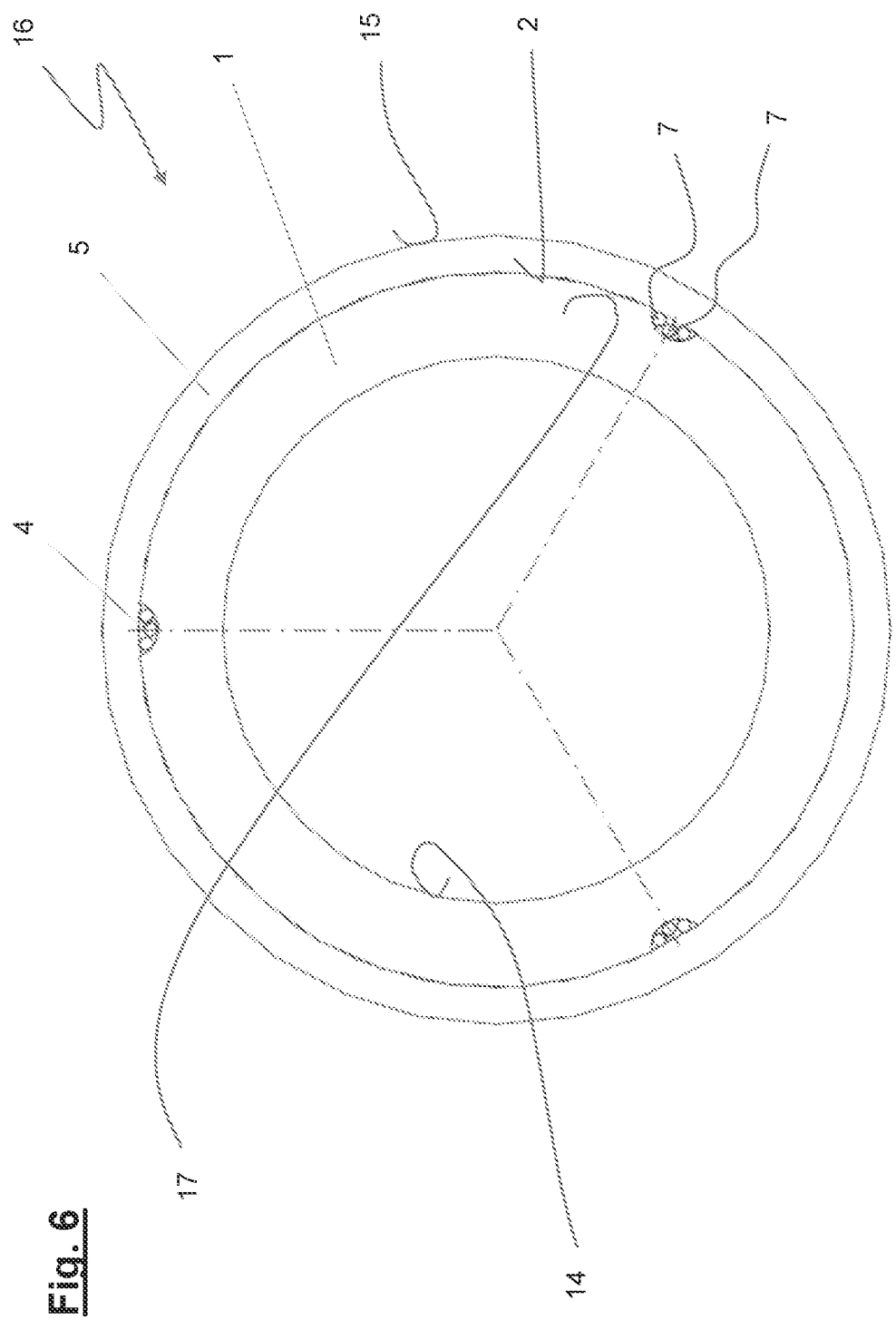
FIG. 6 shows a cross-sectional view through the sensor with inner tube and outer tube of FIG. 3 in a plane in which a pick-up element is arranged.

FIG. 6 shows a cross-sectional view of the finished tube 14 of FIG. 3 after the inner tube 1 and outer tube 5 have been drawn together through the third drawing die. It is evident that three signal lines 7 are arranged in each of the grooves 4. It can also be clearly seen that the outer surface 2 of the inner tube 1 rests against the inner surface 14 of the outer tube 5.

The outer surface of the outer tube 5 is denoted by reference number 15 in the figures.

Figure 9:
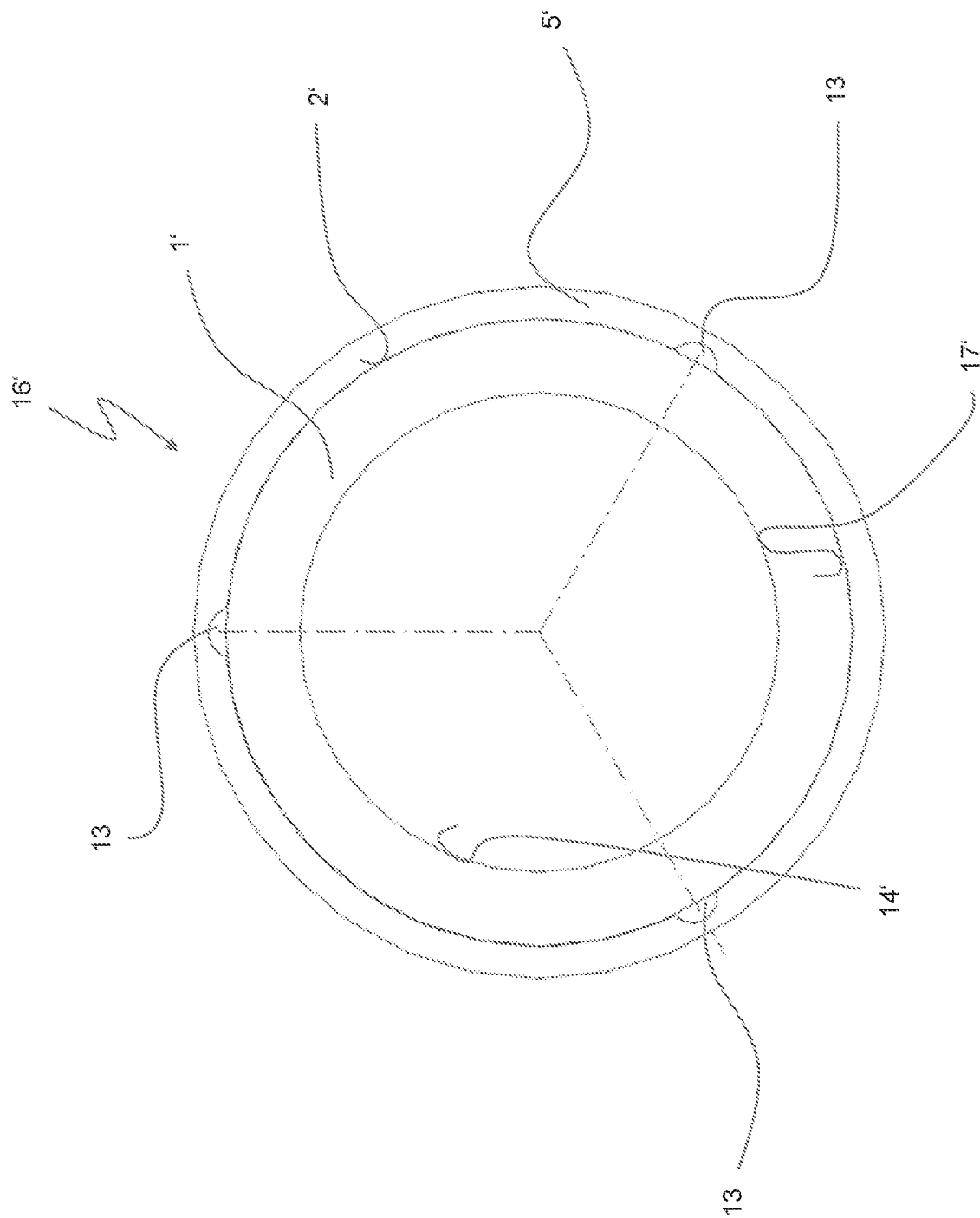
FIG. 9 shows a cross-sectional view of a tube as part of an alternative embodiment of the sensor according to the invention.

FIG. 9 shows an embodiment of a sensor 16' according to the invention, in which the inner tube 1' has an outer surface 2' without grooves and recesses. Instead, three grooves 13 are drawn into the outer tube 5' which in turn is drawn onto the inner tube. For this purpose, the outer tube has been drawn out of a hollow using a drawing die and a mounted drawing core as a tool. This drawing die forms the third drawing die in the sense of the present application.

The drawing core has three outwardly projecting portions on its outer tool surface defining the inner surface of the outer tube, which draw the grooves 13 into the inner surface of the outer tube. In addition, it is possible to provide recesses in the inner surface 17' of the outer tubes 5' in which sensors are placed. These recesses can be introduced into the inner surface 17' by milling.

Figure 10:
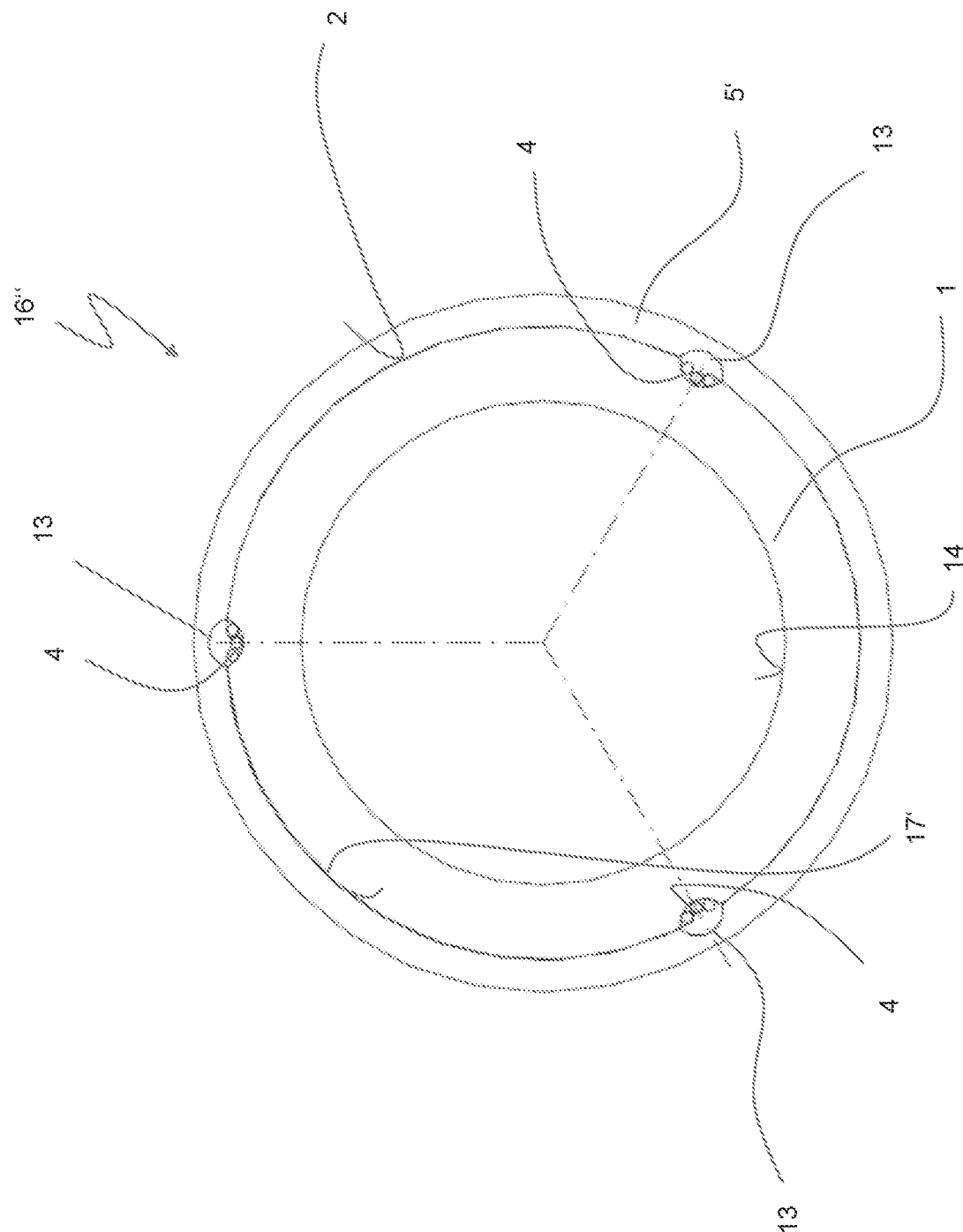
FIG. 10 shows a cross-sectional view of a tube as part of a further embodiment of the sensor according to the invention.

FIG. 10 shows a schematic cross-section through a sensor 16". In this embodiment of the sensor 16", both the inner surface 17' of the outer tube 5' and the outer surface 2 of the inner tube 1 each have four grooves 4, 13. In this case, the grooves 4 of the inner tube 1 and the grooves 13 of the outer tube 5' were manufactured as described for the inner tube 1 of FIGS. 1 to 5 and for the outer tube 5' of FIG. 9. The grooves 4, 13 are arranged so that they each define a common space.

For the purposes of the present application, in all the illustrated embodiments, the inner tube and the outer tube together with the signal lines 7 and the pick-up elements form the sensor 16, 16', 16" for a high-pressure line. In the illustrated embodiments, the pick-up elements are force pick-up elements 8 in the form of strain gauges which detect a force acting on the inner tube 1, 1'. For this purpose, the force pick-up elements 8 are in engagement with the outer surface of the inner tube. Forces are applied to the inner tube, in particular by the pressure of a fluid carried in the tube, so that the sensor 16, 16', 16" is a pressure sensor for a high pressure line.

For purposes of the original disclosure, it is to be understood that all such features as will become apparent to those skilled in the art from the present description, drawings, and claims, even though they have been specifically described in combination with certain further features, both individually and separately, can be combined in any combination with other of the features or groups of features disclosed herein, unless this has been expressly excluded or technical conditions make such combinations impossible or meaningless. A comprehensive, explicit description of all conceivable combinations of features is omitted here for brevity and readability of the description, only.

While the invention has been illustrated and described in detail in the drawings and in the above description, this illustration and description is given by way of example only and is not intended to limit the scope of protection, as defined by the claims. The invention is not limited to the disclosed embodiments.

Variations of the disclosed embodiments will be apparent to those skilled in the art from the drawings, the description and the appended claims. In the claims, the word "comprising" does not exclude other elements or steps, and the indefinite article "a" or "an" does not exclude a plurality. The mere fact that certain features are claimed in different claims does not exclude their combination. Reference signs in the claims are not intended to limit the scope of protection.

LIST OF REFERENCE NUMBERS

1, 1' inner tube
2, 2' outer surface of the inner tube
4 groove in the outer surface of the inner tube
5, 5' outer tube
6 recess
7 signal line
8 pressure pick-up element
9 second drawing die
10 inner tool surface of the drawing die
11 tool dimension
12 projection section of the inner tool surface
13 groove in the inner surface of the outer tube
14, 14' inner surface of the inner tube
15 outer surface of the outer tube
16, 16', 16" sensor
17, 17' inner surface of the outer tube

The invention claimed is:

1. A sensor for a high-pressure line comprising:
    an outer tube of metal with an outer surface, an inner surface, an outer diameter and an inner diameter, and an inner tube of metal with an outer surface, an inner surface, an outer diameter and an inner diameter, wherein the inner tube extends concentrically in the outer tube such that the inner tube and the outer tube together form a tube, and wherein the overall wall thickness measured as half of the difference between the outer diameter of the outer tube and the inner diameter of the inner tube is equal to or larger than the inner diameter of the inner tube;
    at least one groove extending in a longitudinal direction of the tube in the inner surface of the outer tube or in the outer surface of the inner tube;
    at least one signal line placed in the groove; and
    at least one pick-up element connected to the signal line,
    wherein the pick-up element is placed at least in the groove or in at least one recess provided in addition to the groove at least in the outer surface of the inner tube or in the inner surface of the outer tube,
    wherein the outer tube is in a frictional connection with the inner tube, and
    wherein the inner tube is a strain-hardened tube with a tensile strength of 900 N or more.

2. The sensor according to claim 1, wherein the sensor is a pressure sensor, and wherein the at least one pick-up element is a force pick-up element being in engagement with the inner tube such that the force pick-up element during operation of the sensor measures a force applied to the inner tube.

3. The sensor according to claim 1, wherein the sensor comprises three grooves extending in a longitudinal direction of the tube at least in the inner surface of the outer tube or in the outer surface of the inner tube,
    wherein in each of the three grooves at least one signal line is placed,
    wherein at least in each of the three grooves or in three recesses each abutting one of the three grooves a pick-up element connected to at least one signal line is placed, and
    wherein the pick-up elements in the longitudinal direction of the tube are located such there is a cross-sectional plane perpendicular to the longitudinal direction of the tube, which is intersecting all three pick-up elements.

4. The sensor according to claim 3, wherein the three pick-up elements are spaced from each other by 120° in the circumferential direction of the tube.

5. The sensor according to claim 3, wherein the three pick-up elements are force pick-up elements, such that the sensor is a pressure sensor.

6. The sensor according to claim 5, wherein the sensor in addition comprises a thermometer, wherein the thermometer is placed at least in a groove or in a recess placed at least in the outer surface of the inner tube or in the inner surface of the outer tube.

7. The sensor according to claim 1, wherein the inner tube has a larger elongation than the outer tube.

8. The sensor according to claim 1, wherein the overall wall thickness amounts to at least 3 mm.

9. A sensor for a high-pressure line comprising:
an outer tube of metal with an outer surface, an inner surface, an outer diameter and an inner diameter, and an inner tube of metal with an outer surface, an inner surface, an outer diameter and an inner diameter, wherein the inner tube extends concentrically in the outer tube such that the inner tube and the outer tube together form a tube, and wherein the overall wall thickness measured as half of the difference between the outer diameter of the outer tube and the inner diameter of the inner tube is equal to or larger than the inner diameter of the inner tube;
at least one groove extending in a longitudinal direction of the tube in the inner surface of the outer tube or in the outer surface of the inner tube;
at least one signal line placed in the groove; and
at least one pick-up element connected to the signal line, wherein the pick-up element is placed at least in the groove or in at least one recess provided in addition to the groove at least in the outer surface of the inner tube or in the inner surface of the outer tube,
wherein the outer tube is in a frictional connection with the inner tube, and
wherein the inner tube has a larger elongation than the outer tube.

10. The sensor according to claim 9, wherein the sensor is a pressure sensor, and wherein the at least one pick-up element is a force pick-up element being in engagement with the inner tube such that the force pick-up element during operation of the sensor measures a force applied to the inner tube.

11. The sensor according to claim 9, wherein the sensor comprises three grooves extending in a longitudinal direction of the tube at least in the inner surface of the outer tube or in the outer surface of the inner tube,
wherein in each of the three grooves at least one signal line is placed,
wherein at least in each of the three grooves or in three recesses each abutting one of the three grooves a pick-up element connected to at least one signal line is placed, and
wherein the pick-up elements in the longitudinal direction of the tube are located such there is a cross-sectional plane perpendicular to the longitudinal direction of the tube, which is intersecting all three pick-up elements.

12. The sensor according to claim 11, wherein the three pick-up elements are spaced from each other by 120° in the circumferential direction of the tube.

13. The sensor according to claim 11, wherein the three pick-up elements are force pick-up elements, such that the sensor is a pressure sensor.

14. The sensor according to claim 13, wherein the sensor in addition comprises a thermometer, wherein the thermometer is placed at least in a groove or in a recess placed at least in the outer surface of the inner tube or in the inner surface of the outer tube.

15. The sensor according to claim 9, wherein the overall wall thickness amounts to at least 3 mm.

16. A method for manufacturing a sensor for a high-pressure line comprising the steps:
providing an outer tube of metal with an outer surface, an inner surface, an outer diameter and an inner diameter;
providing an inner tube of metal with an outer surface, an inner surface, an outer diameter and an inner diameter, wherein the outer diameter of the inner tube is smaller than the inner diameter of the outer tube, and wherein the overall wall thickness measured as a half of a difference between the outer diameter of the outer tube and the inner diameter of the inner tube is equal to or larger than the inner diameter of the inner tube;
providing at least one groove extending in a longitudinal direction of the outer tube or of the inner tube into at least the inner surface of the outer tube or into the outer surface of the inner tube;
placing at least one signal line in the groove;
placing at least one pick-up element connected to the signal line at least in the groove or in at least one recess provided at least in the outer surface of the inner tube or in the inner surface of the outer tube;
inserting the inner tube into the outer tube such that the inner tube extends in the outer tube; and
drawing the inner tube and the outer tube together through a first drawing die having an inner tool surface forming the outer surface of the outer tube,
wherein a tool diameter of the inner tool surface of the first drawing die is selected such that the by drawing the inner diameter of the outer tube is reduced such that after the drawing the outer tube is in frictional connection with the inner tube.

17. The method according to claim 16, wherein by the drawing of the inner tube and the outer tube together through the first drawing die a wall thickness of the outer tube and the inner diameter of the outer tube are reduced such that the outer diameter of the inner tube is reduced by at least 0.01 mm and by at most 0.3 mm.

18. The method according to claim 17, wherein by the drawing of the inner tube and the outer tube together through the first drawing die the inner diameter of the inner tube is not reduced.

19. The method according to claim 16, wherein providing the inner tube and providing the groove in the outer surface of the inner tube comprises the steps:
providing a hollow of metal; and
drawing the hollow through a second drawing die with an inner tool surface forming the outer surface of the inner tube into inner tube,
wherein an inner tool diameter of the inner tool surface of the second drawing die is selected such that the outer diameter of the inner tube is smaller than the inner diameter of the outer tube, and
wherein the inner tool surface of the second drawing die comprises at least one section projecting inwardly such that the at least one groove extending in a longitudinal direction of the inner tube is drawn into the outer surface of the inner tube.

20. The method according to claim 19, wherein the inner tool surface of the second drawing die comprises a plurality of sections projecting inwardly, such that a plurality of grooves is drawn into the outer surface of the inner tube in a longitudinal direction.

21. The method according to claim 16, wherein, prior to the step of inserting the inner tube into the outer tube, at least the inner tube is worked by chip forming machining, such that at least one recess is formed in the outer surface of the inner tube, and wherein the recess adjoins at least one groove.

* * * * *